Figure 6:
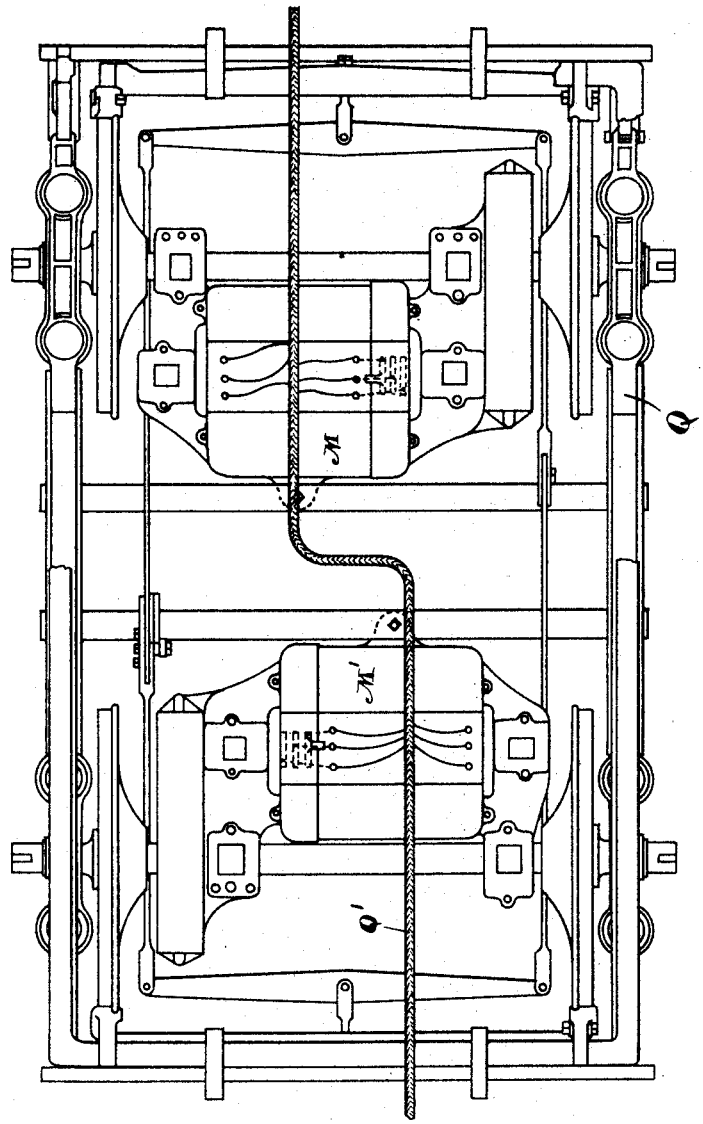

(No Model.) 4 Sheets—Sheet 1.

C. P. STEINMETZ.
OPERATING ALTERNATING MOTORS.

No. 587,340. Patented Aug. 3, 1897.

FIG. 1.

FIG. 2.

WITNESSES
Henry O. Westendarp
J. J. Johnston

INVENTOR
Charles P. Steinmetz
by Bentley and Blodgett
Attys (No Model.)  
4 Sheets—Sheet 2.
C. P. STEINMETZ.
OPERATING ALTERNATING MOTORS.
No. 587,340. Patented Aug. 3, 1897.
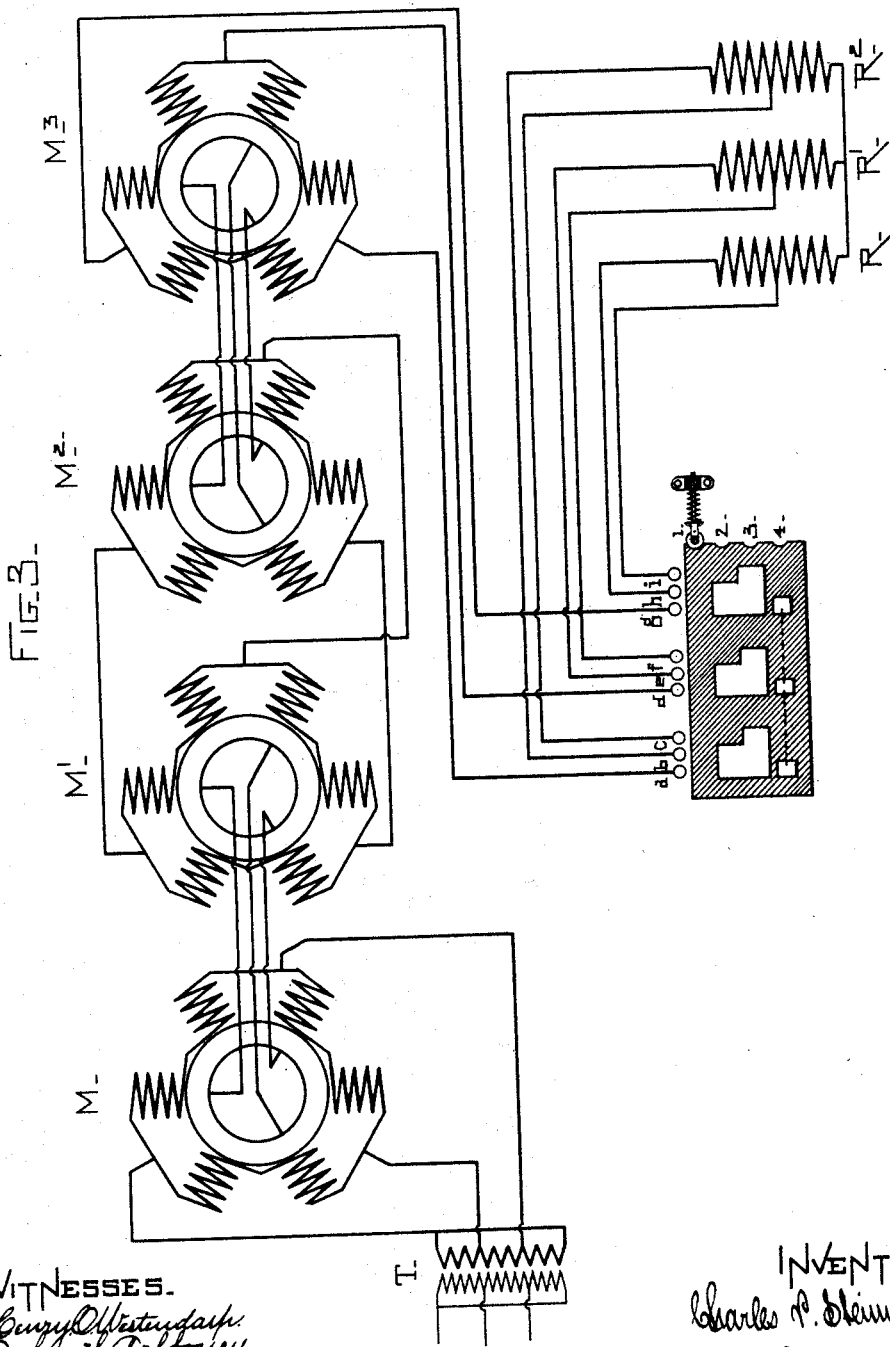

(No Model.)  
4 Sheets—Sheet 3.
C. P. STEINMETZ.
OPERATING ALTERNATING MOTORS.
No. 587,340.  
Patented Aug. 3, 1897.
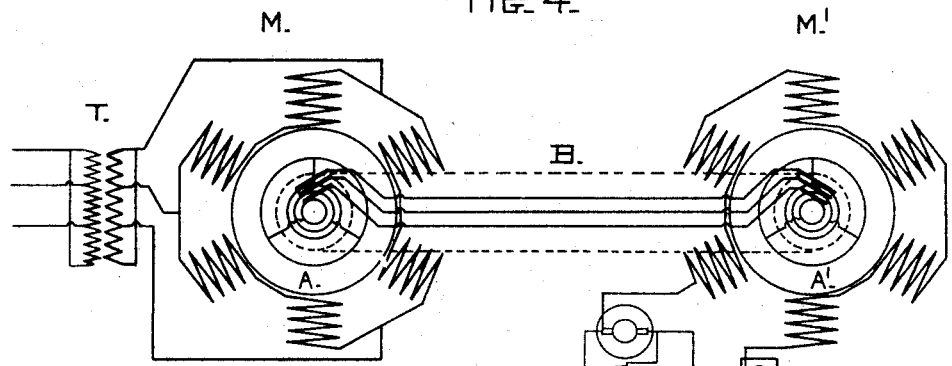
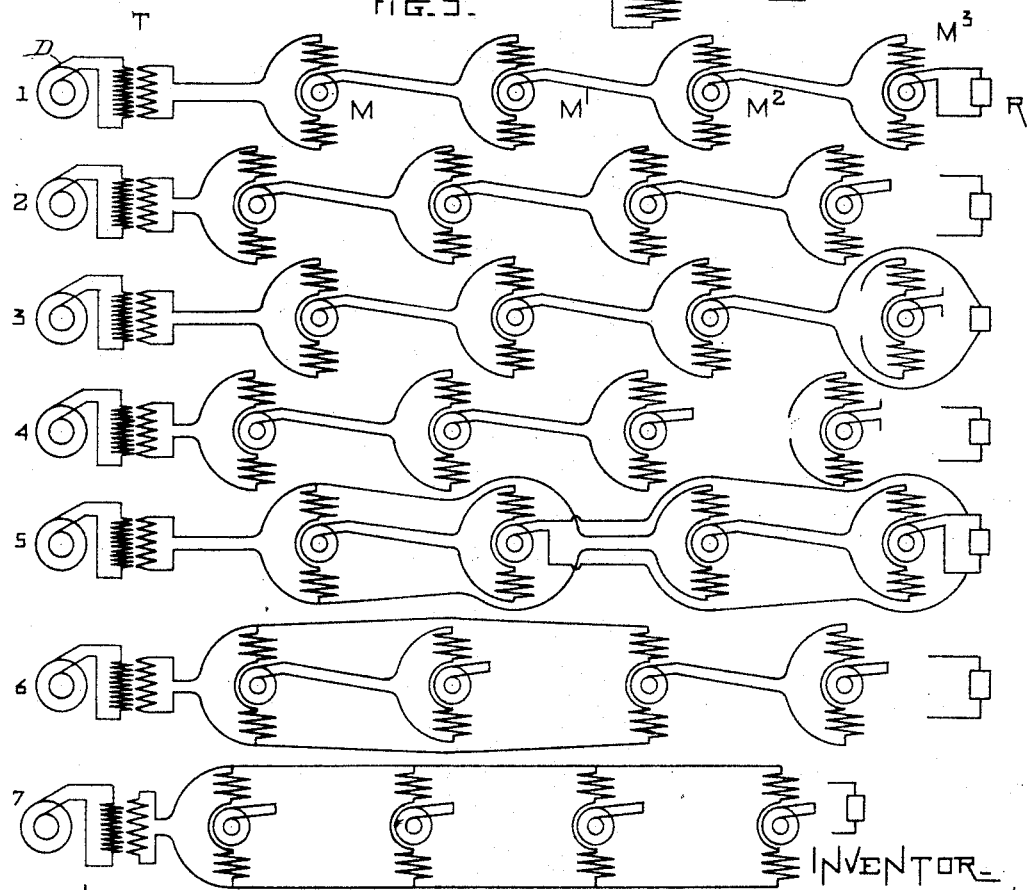
WITNESSES  
Henry Q. Westendorp.  
A. F. Macdonald.
INVENTOR  
Charles P. Steinmetz  
by Bentley and Blodgett  
Attys.

(No Model.)  4 Sheets—Sheet 4.

C. P. STEINMETZ.
OPERATING ALTERNATING MOTORS.

No. 587,340. Patented Aug. 3, 1897.

WITNESSES.
A. F. Macdonald.
E. W. Cady.

INVENTOR.
Charles P. Steinmetz
By [illegible] Atty.

UNITED STATES PATENT OFFICE.

UNITED STATES PATENT OFFICE.

CHARLES P. STEINMETZ, OF LYNN, MASSACHUSETTS, ASSIGNOR TO THE GENERAL ELECTRIC COMPANY, OF NEW YORK.

OPERATING ALTERNATING MOTORS.

SPECIFICATION forming part of Letters Patent No. 587,340, dated August 3, 1897.

Application filed November 23, 1893. Serial No. 491,718. (No model.)

*To all whom it may concern:*

Be it known that I, CHARLES P. STEINMETZ, a subject of the Emperor of Germany, residing at Lynn, Massachusetts, have invented certain new and useful Improvements in Methods of and Apparatus for Operating Alternating-Current Electric Motors, of which the following is a specification.

My invention relates to alternating-current electric motors, especially those commonly known as "induction-motors," and has for its object to provide an improved method of and means for operating such motors. It comprises a combination of circuits with a plurality of motors fed from the same source of power-supply, whereby they are adapted to run at a speed below that which either one would have if connected directly into the supply-circuit, and also a series of combinations of circuits, whereby the said motors may be run at varying speeds; also, in the use of a non-inductive resistance which is arranged to be included in the secondary of the ultimate motor or motors of a series in starting or in changing the speed.

By my invention I am enabled to run alternating-current motors at full efficiency and at different speeds or at full efficiency when fed with currents of a periodicity much higher than would be permissible were the motors connected directly to the line in the usual manner, and also to obtain the same good results in regulating the power and speed of a number of alternating-current motors as are obtained by the use of the "series-parallel" method of control used with continuous-current motors. To these ends I employ two or more motors, one of which must be an induction-motor and the other of which is supplied with current from the induced or secondary winding of the first motor. In case a third motor is used in the same motor series it is supplied with current from the secondary winding of the second motor, and so on. In other words, for any number of motors the primary winding of the first motor is connected directly into the supply-circuit. The induced winding becomes the source of supply for the inducing-winding of the next succeeding motor, whose induced winding in turn becomes the source of supply for the next. In this manner in such a motor series each motor has a twofold function—first, as a motor converting a part of the supplied electrical energy into mechanical work, and, second, as a transformer, transforming part of the supplied electrical energy into electrical energy of the same or of different electromotive force and of lower frequency suitable for the next following motor. In this arrangement the speed of the second motor, if two motors are used, will correspond to the lower frequency of the current supplied by the secondary winding of the first motor, while the speed of the first motor will correspond to the difference between the line frequency and the frequency of the current supplied to the second motor, so that if both motors have the same number of poles the sum of their speeds is substantially equal to the speed which each motor would have when connected or running alone on the main circuit. If one of the motors has a greater or less number of poles than the other, its speed will be increased or reduced proportionally.

The speed which one motor would assume if connected directly into the circuit in the usual way is by this arrangement divided up between the two, so that both may run at half speed, or the one at one-third and the other at two-thirds speed, or in any other desired proportion. In this same manner the speed may be divided up among three or more motors, and each motor will run at full efficiency at one-half, one-third, one-fourth speed, or at any other fraction of the speed at which it would run if connected directly to the line. It is known that an induction-motor can be run at a speed below its normal by inserting a non-inductive resistance into its secondary circuit, but this practice would result in a loss of efficiency due to the waste of energy in the resistance. My present invention substitutes a second motor for this non-inductive resistance, by which the energy is utilized for doing mechanical work in the second and other following motors instead of being wasted in the resistance.

My invention comprises also means for changing the speed of each motor by varying the number of motors constituting the group or by changing the manner in which they are coupled in circuit. Starting, for example, with the motors connected tandem-wise—that is to say, with the secondary member of one motor in circuit with the primary member of a second motor—the primary members are for a higher speed thrown into multiple and their secondaries closed. In many cases, where the number of motors in the series is sufficient, the motors are also connected at times in what I term "multiple-tandem" groups, meaning thereby two or more motors with their primaries connected in multiple to the supply-mains and their secondaries respectively in circuit with the primary members of other motors, as illustrated in diagram 6, Figure 5.

When two or more induction-motors mechanically coupled together are connected in tandem in the manner described, the speed at which the motors will run is determined by the frequency of the main current applied to the leader of the series of motors and the number of motors. For example, two motors so connected will run at substantially half the speed of a single motor, while if the motors are thrown into multiple the speed will be doubled. In this manner changes of speed may be readily secured by changing the number of motors in circuit or the order in which they are connected, and the control thus secured may be rendered even more flexible by the use of resistances, as herein pointed out.

In the accompanying drawings, herein referred to and made a part of this specification, Figs. 1 and 2 are diagrammatic illustrations of my invention applied to two multiphase induction-motors. Fig. 3 is a similar illustration applied to four multiphase motors, all of these figures showing a suitable controller. Fig. 4 shows my invention in modified form with a synchronous motor. Fig. 5 is a diagram illustrating its application to single-phase alternating apparatus; and Fig. 6 shows two motors connected to a common load, which is here represented as an ordinary street-car.

In Fig. 1 the motor M is a three-phase induction-motor of the usual type, the inducing field-magnet winding of which is fed by three-phase currents from any suitable source of power, as from a three-phase transformer T. The secondary member or induced winding instead of being directly closed upon itself or closed through a resistance in the usual manner is connected to three collector-rings, and the three-phase currents taken up by the collector-rings are fed to the primary or inducing winding of the motor M', which is also a multiphase induction-motor. The induced secondary winding of the armature or revoluble member A' is closed through resistances R R' R². At C, I represent the development of a controller-cylinder. The brushes $a\ d\ g$ are connected to the three brushes of the secondary member A' of motor M', while the brushes $b\ c$, $e\ f$, $h\ i$ lead to the resistances mentioned. In the first position of the cylinder the current is interrupted. In position 2 the brushes $a\ b$, $d\ e$, and $g\ h$ rest upon and are electrically connected by the contacts S S' S² upon the controller-cylinder, whereby, as will be seen from the drawings, the resistances R R' R² are included in the different branches of the circuit of the secondary member of the motor M'. The switching connections between the transformer and the motor M are omitted for clearness. In position 3 the brushes $a\ b\ c$, $d\ e\ f$, and $g\ h\ i$, respectively, rest upon the controller-contacts, whereby a portion of the different resistances is cut out, and in position 4 the secondary winding of motor M' is entirely short-circuited, since the brushes $a\ d\ g$ rest upon contacts $s\ s'\ s^2$, which are electrically connected, as is indicated in dotted lines.

The action is as follows: At starting, position 2, the rotary magnetic field set up by the primary winding of the motor M acts upon the winding of A and sets up corresponding secondary currents in its conductors, producing a torque in the movable member. To limit the current at starting, it has been customary heretofore to short-circuit the induced winding through a resistance, which is necessary to get the maximum starting torque; but this plan wastes energy in the resistance, and instead of following such a method I use the induced currents of the winding of A as the source of supply for the primary winding of a second motor M', which is also provided with a secondary member, and the resistance I place in the closed circuit of the secondary member. In this manner I obtain a starting torque from both motors, which is nearly double that which would be produced by the motor M alone. Both motors now begin to rotate. It is to be noted, however, that when the induced member A is standing still the induced currents are of the same frequency as those coming from the transformer, while this frequency is reduced when the member A is in rotation and becomes less and less until at a synchronous speed the frequency of the induced currents would be zero. The frequency of the currents supplied to the motor M' will therefore depend upon the rate of revolution of the secondary member A; and it is further evident that if the member A is run at half synchronous speed the currents supplied to the motor M' are of half frequency, and under these conditions both of the secondary members A A' will run at maximum efficiency at half the speed either would tend to have if connected alone in the primary circuit. This is what takes place when two induction-motors coupled in tandem are geared to a common load by gearing having the same ratio of reduction. The energy supplied to the leader of the series is consumed partly by the mechanical work performed by the first motor and partly by the secondary currents delivered by the first to the second motor, which in this instance will have substantially half the frequency of the main currents. It is likewise evident that if the member A runs at one-third speed the member A' will run at two-thirds speed, and vice versa; or, generally stated, the total initial frequency may be divided up between the two machines in any desired proportion and is then represented by the sum of the speeds, it being understood that the number of poles of both the inducing and induced elements in the two motors are the same. If not the same, then the speeds would bear an inverse ratio to the number of the poles of the respective machines. The resistances R R' R² may be cut out in order to increase the speed of both machines, as in the case of ordinary multiphase motors, by advancing the controller-cylinder to the positions 3 and 4.

In Fig. 2 I show connections for two multiphase induction-motors according to my invention whereby their speed and power may be further varied. T is a three-phase transformer with leads to the brushes $a\ c\ e$, the terminals of the inducing or primary winding of the motor M being the brushes $b\ d\ f$. $h\ k\ n$ are the brushes for the ends of the resistance-leads, the resistance-coils being shown at R R' R², and $i\ l\ o$ are the brushes, including a portion only of this resistance. $p\ q\ r$ are brushes to which lead connections from the respective conductors uniting the secondary members A A' of the motors.

In Fig. 1 the current from the member A is taken up by collector-rings and fed to the inducing element of the motor M'—that is, the stationary element, but as either the stationary or revoluble element may be the inducing element one set of the collecting-rings may be dispensed with by connecting the 1 2 3 leads from the members A A' together, A' becoming now the inducing element of the motor M' and the outer member the induced element. As indicated in the drawings, the 1 leads of the motor members A A' are connected to a collector-ring $r$, the 2 leads to a ring $r'$, and the 3 leads to a ring $r^2$. Position 1 of the controller is the idle position, as before. In position 2 the brushes $a\ b$, $c\ d$, $e\ f$, $g\ h$, $j\ k$, and $m\ n$ are united by the contacts S S' S² S³ S⁴ S⁵ on the switch-cylinder, and the motors bear the same relation as in position 2, Fig. 1—that is, both motors have about the same starting torque. In position 3 one-half of each of the resistances R R' R² is cut out or short-circuited from the closed circuited induced winding of the motor M', increasing the speed of each machine. In position 4 the resistance is entirely short-circuited and the speed of the motors M M' is still further increased. In position 5 a distinct change is made in the order of connections. Both motors now have their primary windings fed in multiple from the transformer T, current from $a$ passing to brushes $b$ and $g$, from $c$ to $d$ and $j$, and from $e$ to $f$ and $m$. The functions of the stationary and movable members of the motor M' are thus reversed, the outer member becoming now the inducing and the inner member the induced element. A corresponding change is made as regards the resistance, which must of course be included in the induced circuit. Therefore in this position the brushes $h\ k\ n$ of the resistances R R' R² are now connected by the switch-contacts to the brushes $q\ r\ p$, respectively, which latter connect to the three conductors uniting the members A A' by the brushes and collector-rings $r\ r'\ r^2$. We thus have the motors M M' running in multiple from the transformer T, and manifestly both will now tend to reach the normal speed of an induction-motor connected to the circuit. In this position the resistance R may be gradually reduced in amount until it is entirely cut out, as is illustrated, respectively, in positions 6 and 7. In position 6 the resistance is decreased and the speed accelerated, and finally in position 7, where the resistance is entirely short-circuited and the motors run at full speed, connected in multiple to the transformer T. It will be seen that if the motors M M' are connected to the same work—as, for instance, in propelling railway-vehicles—the series of connections above described affords a very efficient and useful method of changing their torque and speed, giving, in effect, a series of connections for alternating-current motors having the advantage of what is known as the "series-parallel" control of continuous-current motors.

By referring to the development of the switch-cylinder in Fig. 2 it will be seen that the first four positions correspond with the similar positions of the switch shown in Fig. 1, the only difference being that the switch not only controls the connections between the motors, but also in the first position breaks circuit between the transformer T and the first of the motors, additional contacts S³ S⁴ S⁵ being provided for this purpose. In position 5 the brushes $g\ j\ n$ rest, respectively, upon contacts $s^3\ s^4\ s^5$, which are connected with S³ S⁴ S⁵, so that the inducing-windings of the motors are in multiple with the source of power-supply. The brushes $p\ q\ r$ rest upon contacts $s^6\ s^7\ s^8$ and the brushes $h\ k\ n$ on contacts $s^9\ s^{10}\ s^6$. The contact $s^7$ is connected to $s^9$ and $s^8$ to $s^{10}$, so that the circuit from ring $r$, for example, may be traced as follows: from contact $s^8$ to $s^{10}$, brush $k$, resistance R', where the current may divide, part passing through resistance R, brush $n$, contact $s^6$, brush $p$, and ring $r^2$, the other path being through resistance R², brush $h$, contact $s^9$, contact $s^7$, brush $q$, and ring $r'$. In position 6 part of the resistances are short-circuited, and in position 7 the resistances are entirely short-circuited, since the brushes $p\ q\ r$ are all connected by the contact $s^{12}$. This method of control may be applied to any number of motors, as in Fig. 3, which shows its application to four induction-motors M M' M² M³, each of the last three motors receiving its energizing-current from the induced winding of the preceding motor. If these motors have the same number of poles and are connected to the same work, they will run at maximum efficiency at one-fourth the speed they would have connected singly into the supply-circuit. As either winding of the induction-motor may act as the induced member, they are illustrated interchangeably in the figure, this arrangement allowing me to dispense with one set of sliding connections, as already explained in connection with Fig. 2. A series of connections similar to that shown in Fig. 2 may be carried out in the case of the four motors here shown, and evidently the combinations for different speeds which may be effected are largely increased. Thus the motors may all be placed in series at the start with the resistances R R' R² in the induced winding of the last motor of the series. The resistance may then be reduced and finally cut out, short-circuiting the secondary or induced conductors of the last motor. The primary windings of motors M M' may then be placed in multiple with the transformer T, with their secondaries closed, respectively, through the primary windings of the motors M² M³. All the motors will now run at one-half their highest speed. After this they may be placed in multiple for the final and highest speed. Throughout these different arrangements of connections the resistances R R' R² may be used or not, as desired. It may be found advisable to use the resistances at the start. It is obvious that when the motors are connected to the same work the connections of the primary and secondary circuits must always be such as will cause the movable members to revolve in the desired direction.

In Fig. 4 I show that the second motor may be a synchronously-running machine with its field-magnets excited by a continuous current from any suitable source, as from an exciter E, regulated in the usual way by a resistance R. In this case one of the induction-motors of the former figures is replaced by a synchronous motor, to which currents are delivered from the induced winding A. It will consequently run at a speed corresponding to this frequency, as does the induction-motor above mentioned. One advantage of this arrangement is that the second motor M' may be regulated to control the phase relation of current and electromotive force, as described in my application, Serial No. 404,265, filed August 31, 1891, this regulation being effected in the induced circuit of the first motor and thereby in the inducing-circuit and main line.

While I have so far shown the invention as used with multiphase currents, it is equally applicable to alternating currents of any character, whether of one or more phases, and in Fig. 5 I show a series of four motors fed by single-phase alternating currents in various connections for changing their speed in accordance with my invention. In diagram 1 four motors M M' M² M³ are shown as supplied with single-phase alternating currents from a dynamo D and intermediate transformer T, the motors being arranged as in Fig. 3—that is, each inducing winding of the motors M' M² M³ is fed by the secondary winding of the preceding motor, and in the last induced winding is included a resistance R, as before. This gives the lowest speed. In diagram 2 the secondary winding of the motor M³ is short-circuited and the motors now run at one-quarter full speed. In diagram 3 the fourth motor is cut out and the secondary winding of the third motor is closed through the resistance. In diagram 4 this winding is short-circuited and the motor series runs at one-third speed, one motor being entirely cut out. In diagram 5 the inducing windings of the first and third motors are joined in parallel and their induced windings feed into the inducing windings of the motors M² M³, respectively, the induced windings of these motors being joined in parallel and closed through the resistance R. In diagram 6 the induced windings of the motors M' M³ are closed-circuited, and the motors are thus placed in two groups, each of two motors in tandem, whereby the speed is made one-half the highest speed, and in diagram 7 the inducing members of all the motors are joined in parallel and each induced winding is short-circuited or closed on local circuit, whereby the motors are run at full speed.

The diagrams above described show different arrangements in which the motors can be coupled in order and obtain varying speeds and torques. Thus in diagrams 1 and 2 a number of motors are connected in tandem, and in diagram 3 it is indicated that different speeds may be secured by cutting one or more motors out of circuit, and finally in diagram 7 the position of highest speed is represented with the motors in multiple. I do not, however, make a specific claim to the invention of changing motors from tandem to multiple by first cutting out one of the motors and then reconnecting the cut-out motor or motors in multiple.

In all of the above combinations of circuits between alternating motors arranged in the manner described I prefer that they should also be mechanically connected or geared together in the ratio of their desired speeds, reference being had to the relative number of poles of the different motors. Where this is not done, a tendency to oscillation may exist or one motor may revolve at a speed out of proportion to the other.

Gearing the motors together insures a proper division of the speed of the motors—that is to say, of the speed at which alternating currents of given frequency would drive a single motor when connected in circuit in the ordinary manner. The invention, therefore, is especially applicable to installations where two or more motors are required to drive a common load and where variable speeds of the driven load are desirable—as, for instance, in electric railways.

In Fig. 6 two alternating motors of the type hereinbefore specially mentioned are shown mounted on the truck of a railway-car Q. The motors are respectively geared to the two axles of the truck. The motors are supplied with current in any desired manner, and the circuit-wires leading to their primary and secondary parts are shown as wrapped into an insulating-cable Q', which extends to controlling-switches at the opposite end of the car. The only part of this arrangement, however, material to the present invention is the gearing of two motors to a common load. By the controlling-switches the motors may be coupled in tandem, as already explained, so as to drive the car at substantially half-synchronous speed, and other combinations of circuits, such as already described, may be effected.

So far as I am aware I am the first to devise a method and means of operating alternating-current motors in tandem, and I am also the first to combine alternating-current motors with a controller by means of which they may be connected in various combinations, in tandem or in multiple, to obtain various speeds and torques. I therefore wish to claim, broadly, such combinations as I have herein indicated.

Where I employ the term "multiphase" in describing my invention I do not mean to limit myself to those cases wherein a multiphase effect is obtained by means external to the motor; but I also mean to include all methods of obtaining rotary magnetic fields by a succession of phases in the motor however they may be obtained, whether by windings in the motor itself or by a phase-splitter or directly from the transformer or generator.

Having thus described my invention, what I claim as new, and desire to secure by Letters Patent of the United States, is—

1. The method of operating alternating-current motors, which consists in feeding alternating currents to one member of one such motor from a source of power-supply, converting the energy so supplied to the motor partly into mechanical energy expended in driving a driven mechanism, and partly into electrical energy in the form of alternating currents induced in the secondary element of the motor, and supplying a second alternating motor with the said secondary currents, as set forth.

2. The method of operating alternating-current motors, which consists in feeding alternating currents to one member of such a motor, converting that portion of the energy so supplied, which is not utilized as mechanical work performed by the motor, into electrical energy in the form of alternating currents induced in the secondary member of the motor, and supplying such currents to a second translating device directly or indirectly in circuit with the induced member of the motor, as set forth.

3. The method of operating alternating-current motors of the induction type, which consists in feeding alternating currents to the primary or inducing member of one such motor, inducing secondary currents of different frequency in the secondary member of the motor, and feeding such secondary currents to the inducing member of a second induction-motor, provided with a closed-circuited secondary member.

4. The method of operating alternating-current motors of the induction type, which consists in feeding multiphase currents to the primary member of an induction-motor, inducing secondary currents of different frequency in the secondary member of the motor by its rotation in the magnetic field of the primary member, and closing the circuit of the secondary member through the primary of a second induction-motor provided with a closed-circuited secondary.

5. The method of operating alternating-current motors of the induction type, which consists in supplying the primary member of one such motor with alternating currents from a source of power-supply, and the primary members of one or more other motors in succession with current induced in the secondary member of the preceding motor, and regulating the motors by varying the resistance of the circuit of the secondary member of the last motor.

6. The method of operating a plurality of alternating-current motors of the induction type, which consists in coupling them in tandem, as described, with the secondary of one motor in circuit with the primary of another motor, then coupling them in multiple-tandem groups, and finally, for a still higher speed, coupling them in multiple, as set forth.

7. The method of operating alternating-current motors of the induction type, which consists in connecting them in circuit tandemwise with a resistance in the local circuit of the last-induced member, then reducing and cutting out the resistance, then connecting the motors in multiple-tandem groups, and finally connecting them all in multiple.

8. The method of regulating alternating-current electric motors of the induction type, which consists in connecting the secondary or induced element of one motor with the inducing element of a second motor, and then connecting the inducing elements of the different motors in multiple with the same source of current-supply, as set forth.

9. The method of regulating alternating-current electric motors of the induction type, which consists in connecting the secondary or induced element of one motor with the inducing element of a second motor, and with the secondary of the second motor closed-circuited, and then connecting the inducing elements of the different motors in multiple with the same source of current-supply, and closing the secondary elements of the two motors, as set forth.

10. The method of regulating alternating-current electric motors, which consists in connecting the induced element of one motor with the inducing element of a second motor and with a resistance in circuit with the induced element of the second motor, then cutting out the resistance, and finally coupling the inducing elements of the motors in multiple, and closing the circuits of their secondary elements.

11. The method of regulating alternating-current motors of the induction type, which consists in feeding the inducing element of one motor with alternating currents, connecting the induced element of the motor with the inducing element of a second motor and with a resistance in the circuit of the secondary element of the last-mentioned motor, varying the resistance, coupling the inducing elements of the motors in parallel and closing the induced elements through a resistance, and finally cutting out the resistance, as set forth.

12. The combination of two alternating-current motors each geared to a driven mechanism of which the inducing element of one is in circuit with the induced element of the other.

13. In combination, a plurality of alternating-current motors each geared to a driven mechanism having relatively revolving inducing and induced members, the induced member of each motor except the last connected to the inducing member of the next succeeding motor, and a resistance included in the induced circuit of the last motor, whereby alternating-current motors may be operated in tandem, as set forth.

14. The combination of a plurality of alternating-current motors each geared to a driven mechanism having relatively revolving primary and secondary members, and a resistance, with a switch, contacts and electrical connections for coupling the secondary element of one motor in circuit with the primary member of a second motor, and for coupling the whole or a desired portion of the resistance in circuit with the secondary member of the last-named motor.

15. The combination of two or more alternating-current motors geared together or mechanically connected to a common driven mechanism, and having the induced element of one motor in circuit with the inducing member of a second motor, as set forth.

16. The combination with two or more alternating-current induction-motors having relatively-revolving inducing and induced members, and mechanically connected to a common driven mechanism, with means for supplying multiphase alternating currents to the inducing member of one motor, and connections between the induced member of the motor and the inducing member of a second motor, as set forth.

17. The combination of a plurality of alternating-current induction-motors, and a switch for coupling the induced member of one motor to the inducing member of a second motor, and for connecting the inducing members of the two motors in multiple, as set forth.

18. The method of varying the speed of driven mechanism connected to a plurality of alternating motors of the induction type, which consists in connecting the motors in tandem, that is to say, with the induced element of one motor connected to the inducing member of another, and changing the number of the motors so connected, by cutting one or more motors into and out of the series so connected, as set forth.

19. The method of operating alternating-current motors of the induction type mechanically coupled together or geared to a common driven mechanism, which consists in supplying to one such motor energy in the form of alternating electric currents from a source of power-supply, and supplying to a second motor the excess of energy not expended in mechanical work performed by the first motor, in the form of alternating currents induced in the secondary member of the first motor.

20. The method of operating alternating-current motors of the induction type, which consists in connecting them to a source of power-supply in tandem, in the manner described, then throwing the inducing element of one motor and the induced element of a second motor into multiple with the source of supply, and closing the circuit of the remaining elements of such motors, as described.

21. In combination, a plurality of alternating-current motors having inducing and induced members, and circuit connections from the induced member of each motor except the last feeding current into the inducing member of a succeeding motor, the induced member of the last motor being closed-circuited.

Signed at Lynn, Massachusetts, this 20th day of November, 1893.

CHARLES P. STEINMETZ.

Witnesses:
 JOHN W. GIBBONEY,
 BENJAMIN B. HULL.